Jan. 25, 1944.  G. F. SAUERS  2,340,082
METAL CLAD SWITCHGEAR
Filed May 10, 1941  3 Sheets-Sheet 1

WITNESSES:

INVENTOR
Gordon F. Sauers.
BY
ATTORNEY

Jan. 25, 1944.  G. F. SAUERS  2,340,082
METAL CLAD SWITCHGEAR
Filed May 10, 1941  3 Sheets-Sheet 2
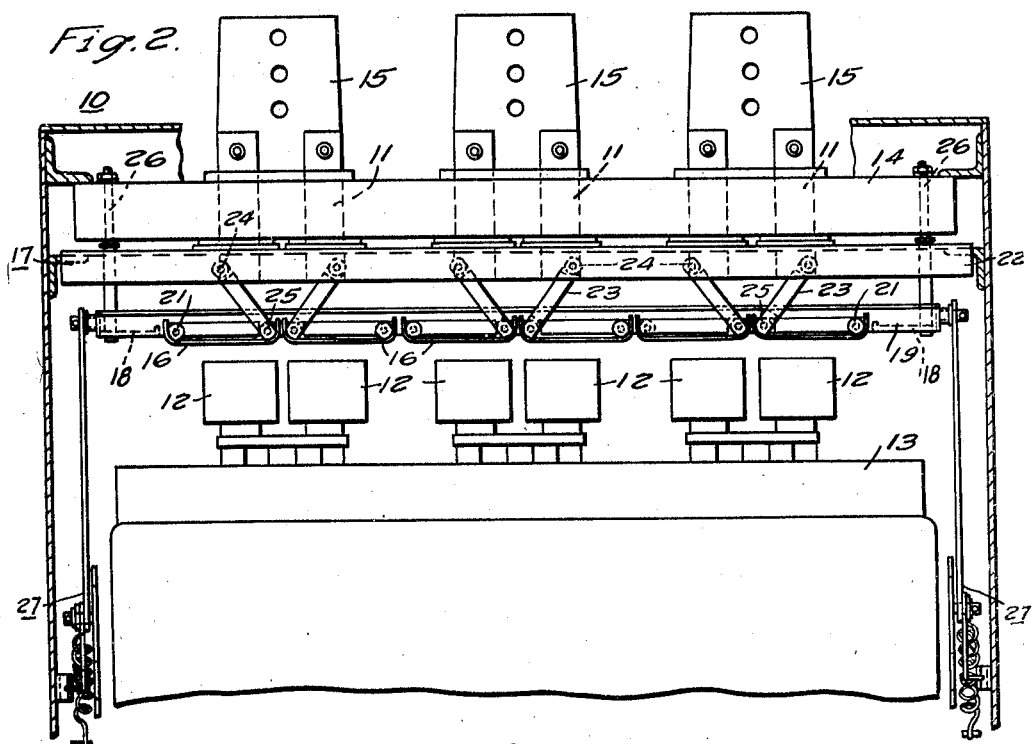
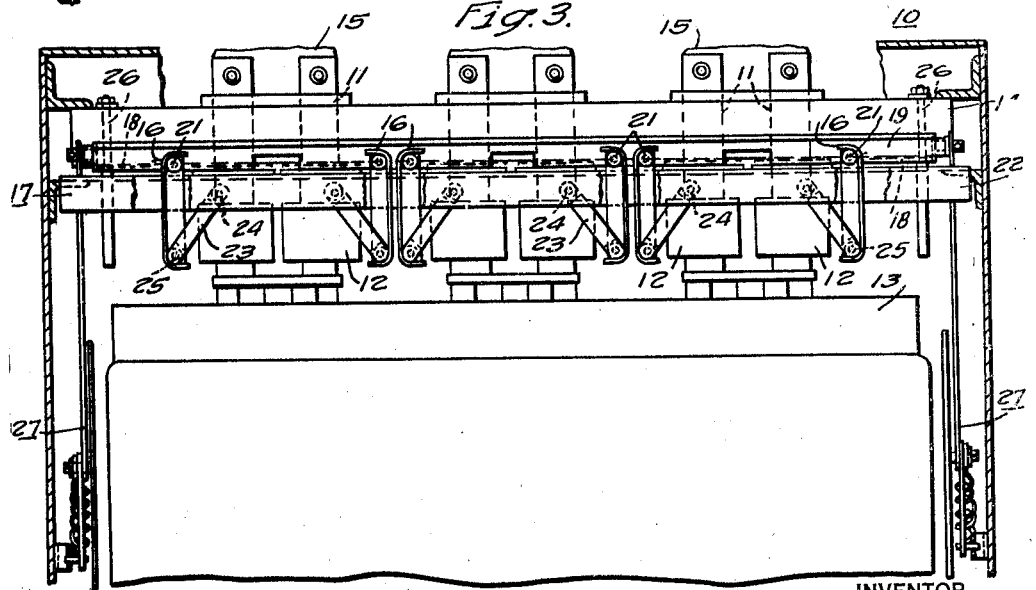

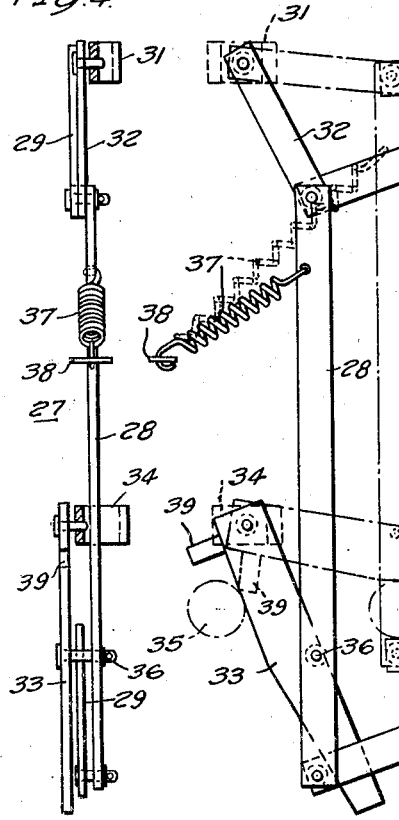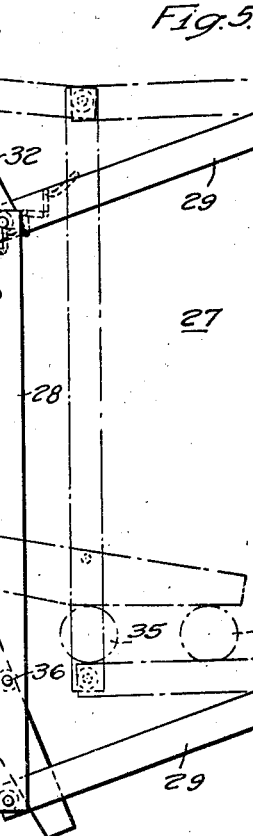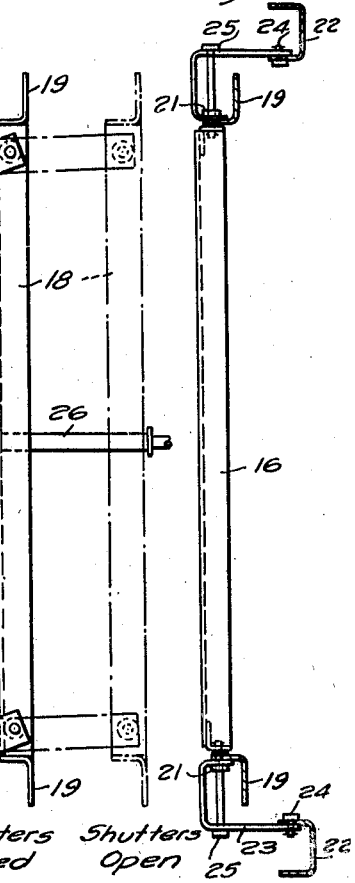

Patented Jan. 25, 1944

2,340,082

UNITED STATES PATENT OFFICE 2,340,082

METAL-CLAD SWITCHGEAR

Gordon F. Sauers, Pittsburgh, Pa., assignor to Westinghouse Electric & Manufacturing Company, East Pittsburgh, Pa., a corporation of Pennsylvania Application May 10, 1941, Serial No. 392,887

7 Claims. (Cl. 175—298)

My invention relates, generally, to electric switchgear and, more particularly, to switchgear of the metal-enclosed type wherein a switchgear unit is removable from an enclosing cell structure.

In metal enclosed switchgear having removable circuit breakers of high current capacity, the available space is frequently so limited that shutters of a conventional type cannot be utilized for protecting the stationary primary contacts when the circuit breaker is withdrawn from the cell.

An object of my invention, generally stated, is to provide a shutter assembly for enclosed switchgear which shall be simple and efficient in operation and which may be economically manufactured and installed.

A more specific object of my invention is to provide a shutter mechanism which may be installed and operated in a relatively small amount of space.

Another object of my invention is to provide a shutter assembly in which the shutter vanes protect the primary disconnect contact members when closed and also function as barriers between the contact members when open.

Other objects of my invention will be explained fully hereinafter or will be apparent to those skilled in the art.

In accordance with my invention, a plurality of channel-shaped vanes are so mounted in a movable frame that the vanes are automatically swung from the closed position to positions between the stationary contact members as the breaker enters the cell. Likewise, the vanes are automatically closed as the breaker is withdrawn from the cell. Thus, the vanes function as shutters when the breaker is out of the cell and as barriers between phases when the breaker is in the cell.

For a fuller understanding of the nature and objects of my invention, reference may be had to the following detailed description, taken in conjunction with the accompanying drawings, in which:

Fig. 2 is a view, partly in plan and partly in section, of the shutter assembly shown in Fig. 1, a breaker unit being partly inserted into the cell and the shutters being closed;

Fig. 3 is a view, similar to Fig. 2, with the shutters open and the breaker unit fully inserted into the cell;

Fig. 4 is a view in front elevation, of a portion of the operating mechanism for the shutters;

Fig. 5 is a view, in side elevation, of the operating mechanism; and

Fig. 6 is a view, partly in side elevation and partly in section, of the shutter assembly.

Figure 1:
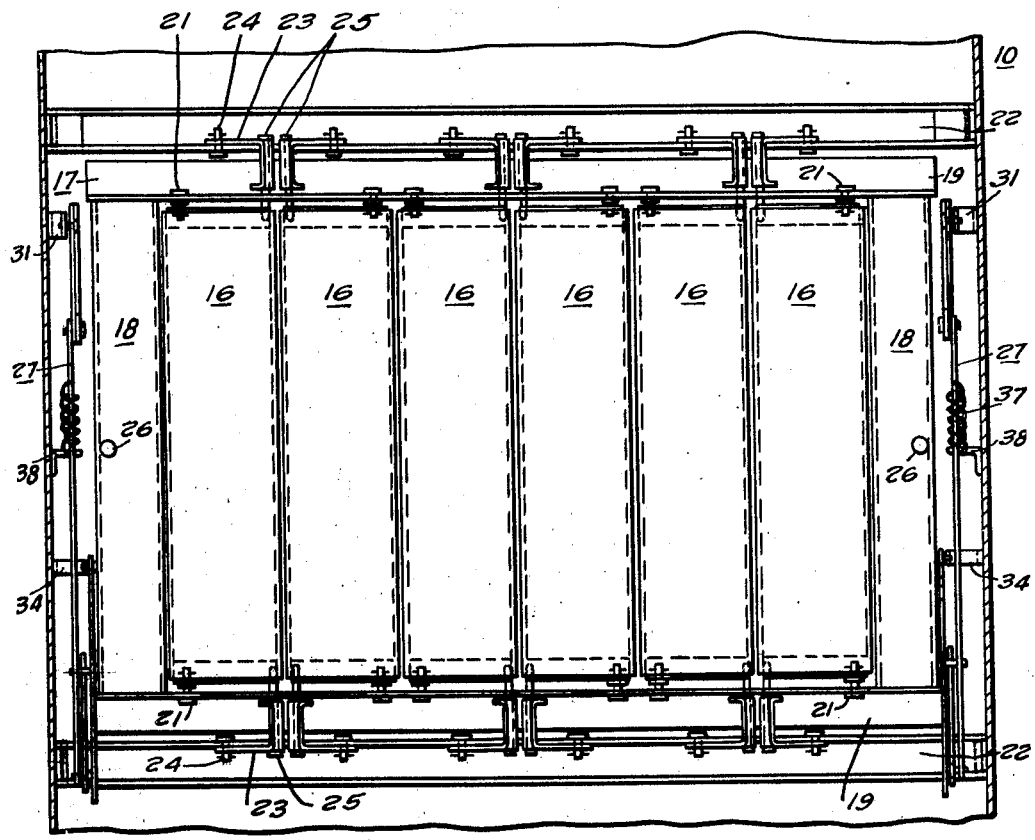
Figure 1 is a view, partly in elevation and partly in section, of a shutter assembly embodying my invention.

Referring to the drawings and particularly to Figures 1, 2 and 3, the switchgear apparatus shown therein comprises a stationary or cell structure 10 in which a plurality of fixed primary disconnect contact members 11 are disposed to be engaged by the cooperating movable contact members 12 carried by a movable circuit breaker unit 13 which may be of the truck type suitable for withdrawal from the cell 10 in a manner well known in the art. The stationary contact members 11 may be mounted in a supporting member 14 disposed in the cell 10.

Since the stationary contact members 11 are connected to current-carrying conductors 15, it is desirable to provide some means for preventing contact with the stationary members 11 when the circuit breaker unit 13 is withdrawn from the cell. It has been the usual practice to provide shutters for protecting the stationary contact members.

The shutters are usually automatically opened when the circuit breaker unit is inserted into the cell and automatically closed when the breaker is withdrawn from the cell, thereby affording the desired protection. However, shutters of previously known types require more space than is available in modern switchgear apparatus of high current capacity. Furthermore, it is desirable to provide insulating barriers between the stationary contact members 11 which are connected to difference phases of a three-phase power system. In order to provide shutters which require a minimum amount of space for their operation and also which will function as barriers between phases, I have devised the shutter assembly and operating mechanism herein disclosed.

As shown, the shutter assembly comprises a plurality of channel-shaped vanes 16 which are pivotally mounted in a rectangular frame 17 comprising vertically disposed channel members 18 and horizontally disposed angle members 19 which may be welded together to form the rectangular frame 17. Each one of the vanes 16 is pivotally mounted in the frame 17 by means of a pair of pins 21 disposed in the angle members 19 at the top and bottom of each vane. The side of each vane opposite the pins 21 is connected to stationary members 22 in the cell 10 by means of arms 23, one end of which is pivotally connected to the stationary members 22 by a pin 24 and the other end of which is pivotally connected to the vane 16 by means of a pin 25.

The frame 17 which supports the vanes 16 is guided for rectilinear movement by a pair of pins 26 which are secured in the stationary member 14. As shown, one of the pins 26 projects through an opening provided in each one of the upright members 18 of the frame 17.

Referring to Figs. 2 and 3, it will be seen that each one of the shutters 16 is swung through an arc from a position between the fixed contact members 11 and the movable contact members 12 to a position between the fixed contact members when the frame 17 is moved along the guiding pins 26 from a position in front of the stationary member 22 to a position at the rear of the member 22. In other words, the side of each shutter which is connected to the angle members 19 by the pins 21 is moved to the rear in a straight line, since the frame 17 moves in a straight line. Since the end of each arm 23 is connected to the stationary member 22 at a fixed point by the pin 24, the arms 23 and the shutters 16 swing from the position shown in Fig. 2 to the position shown in Fig. 3 as the frame 17 is moved toward the rear of the cell.

In order that the shutters 16 shall be automatically opened when the breaker unit 13 is inserted into the cell and automatically closed as the breaker is withdrawn from the cell, a linkage mechanism 27 is provided which is operated by the movement of the breaker to open the shutters 16. As shown in Figs. 1 and 2, the linkage mechanism is duplicated at each side of the cell structure. Accordingly, only the mechanism disposed at one side will be described hereinafter.

As shown in Figs. 4 and 5, the linkage mechanism 27 comprises a vertically disposed bar 28 which is pivotally connected to the upright member 18 near the top and bottom of the member 18 by bars 29. One end of the bar 28 is also pivotally connected to a bracket 31 by a short bar 32. The bracket 31 is secured to the side of the stationary cell 10. A lever 33 having one end pivotally secured to a bracket 34 is disposed to be engaged by a wheel 35 on the circuit breaker unit 13. The lever 33 is pivotally connected to the vertical bar 28 at a point 36.

As shown in Fig. 5, the lever 33 is raised to substantially a horizontal position by the wheel 35 as the breaker is inserted into the cell. The upward movement of the lever 33 raises the vertical bar 28, and since the upper end of this bar is connected to a fixed point 31 by the arm 32, the bar 28 is moved inwardly and upwardly to raise the bars 29 to substantially a horizontal position, as shown by the broken lines, thereby moving the member 18 in a straight line along the guide pin 26, as hereinbefore described.

It will be noted that the lower side of the lever 33 is so shaped that the movement of the linkage mechanism takes place rapidly during a short distance of travel from the point where the wheel 35 first engages the lever 33. During the latter portion of the inward movement of the breaker unit, no further movement of the linkage mechanism takes place.

In order that the shutters shall be automatically closed when the breaker is withdrawn from the cell, a spring 37 having one end secured to a bracket 38 on the side of the cell 10 and the other end secured to the vertical bar 28 of the linkage mechanism is provided for lowering the bar 28 as the breaker is withdrawn. A downwardly extending projection 39 is provided on the lower side of the lever 33 to prevent any possibility of the shutters sticking in the open position as the breaker unit is withdrawn from the cell. It will be seen that the projection 39 will be engaged by the wheel 35, and cause the lever 33 to lower the bar 28 in case the bar is not lowered by the spring 37 and the force of gravity on the linkage mechanism.

From the foregoing description it is apparent that I have provided a shutter assembly which may be installed and operated in a relatively small amount of space and which functions both as a shutter device to prevent access to the energized contact members of an enclosed switchgear structure and also as a barrier between the phases of the power conductors. Furthermore, the operating mechanism for the shutters is simple and positive in operation, thereby insuring the proper functioning of the shutter mechanism at all times. The shutter assembly herein disclosed is suitable for switchgear apparatus of either the high voltage or low voltage type, since the shutter vanes may be composed of either sheet steel or of a molded insulating material.

Since numerous changes may be made in the above described construction and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. The combination with a stationary structure and a movable structure having cooperating contact members disposed thereon in phased relation, of a plurality of pairs of pivotally mounted shutter members disposed between said structures, and means carried by the stationary structure and actuated by the movement of the movable structure for individually swinging the members of each pair of said shutter members through an arc into a position on opposite sides of the contact members for one phase.

2. The combination with a stationary structure and a movable structure having cooperating contact members disposed thereon in phased relation, of a plurality of pairs of pivotally mounted shutter members disposed between said structures, and a linkage mechanism carried by the stationary structure and actuated by the movement of the movable structure for individually swinging the members of each pair of said shutter members through an arc into a position on opposite sides of the contact members for one phase.

3. The combination with a stationary structure and a movable structure having cooperating contact members disposed thereon in phased relation, of a plurality of pairs of pivotally mounted shutter members disposed between said structures, a linkage mechanism carried by the stationary structure for individually swinging the members of each pair of said shutter members through an arc into a position on opposite sides of the contact members for one phase, and a lever pivoted to the stationary structure and actuated by movement of the movable structure to operate said linkage mechanism.

4. In switchgear apparatus, the combination with a stationary cell and a movable breaker unit having cooperating contact members disposed thereon, of a plurality of shutter members disposed to prevent access to the contact members in the cell when the breaker unit is withdrawn, said shutter members being pivotally mounted in a rectilinearly movable frame and pivotally connected to the cell structure, and means operated by movement of the breaker unit to move said frame, thereby actuating the shutter members to a position between the contact members in the cell.

5. In switchgear apparatus, the combination with a stationary cell and a movable breaker unit having cooperating contact members disposed thereon, of a plurality of shutter members disposed to prevent access to the contact members in the cell when the breaker unit is withdrawn, said shutter members having one side pivotally mounted in a rectilinearly movable frame and the other side pivotally connected to the cell structure, and means operated by movement of the breaker unit to move said frame, thereby swinging said shutter members through an arc to a position between the contact members in the cell.

6. In switchgear apparatus, the combination with a stationary cell and a movable breaker unit having cooperating contact members disposed thereon, of a plurality of shutters disposed to prevent access to the contact members in the cell when the breaker unit is withdrawn, said shutters having one side pivotally mounted in a rectilinearly movable frame and the other side pivotally connected to the cell structure, and a linkage mechanism operated by movement of the breaker unit to move said frame, thereby swinging said shutters through an arc to a position between the contact members in the cell.

7. In switchgear apparatus, the combination with a stationary cell and a movable breaker unit having cooperating contact members disposed thereon, of a plurality of shutter members disposed to prevent access to the contact members in the cell when the breaker unit is withdrawn, said shutter members having one side pivotally mounted in a rectilinearly movable frame and the other side pivotally connected to the cell structure, and a linkage mechanism carried by the cell and operated by movement of the breaker unit to move said frame, thereby swinging said shutter members through an arc to a position between the contact members in the cell.

GORDON F. SAUERS.